US008688800B2

(12) United States Patent
Fineberg et al.

(10) Patent No.: US 8,688,800 B2
(45) Date of Patent: Apr. 1, 2014

(54) REMOTE CONFIGURATION OF PERSISTENT MEMORY SYSTEM ATT TABLES (75) Inventors: Samuel A. Fineberg, Palo Alto, CA (US); Pankaj Mehra, San Jose, CA (US); Rahul Nim, Freemont, CA (US); Tom A. Heynemann, Boulder Creek, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2085 days.

(21) Appl. No.: 11/243,848

(22) Filed: Oct. 5, 2005

(65) Prior Publication Data

US 2007/0078940 A1    Apr. 5, 2007

(51) Int. Cl.
*G06F 15/16* (2006.01)

(52) U.S. Cl.
USPC .......................................... 709/216; 709/217

(58) Field of Classification Search
USPC ................................................ 709/216, 217
See application file for complete search history.

(56) References Cited

U.S. PATENT DOCUMENTS

| 6,442,613 | B1 * | 8/2002 | Gregg et al. ............... 709/232 |
| 6,629,145 | B1 | 9/2003 | Pham et al. |
| 6,732,165 | B1 | 5/2004 | Jennings, III |
| 7,024,463 | B1 * | 4/2006 | Hitomi et al. ............... 709/214 |
| 2002/0103945 | A1 * | 8/2002 | Owen et al. ................. 710/10 |
| 2004/0148360 | A1 * | 7/2004 | Mehra et al. ............... 709/212 |
| 2004/0190546 | A1 | 9/2004 | Jackson |
| 2005/0132250 | A1 * | 6/2005 | Hansen et al. ................. 714/5 |
| 2005/0203961 | A1 | 9/2005 | Mehra et al. |
| 2005/0203974 | A1 | 9/2005 | Smith et al. |
| 2005/0216552 | A1 * | 9/2005 | Fineberg et al. ............ 709/203 |
| 2006/0230119 | A1 * | 10/2006 | Hausauer et al. ............ 709/216 |

OTHER PUBLICATIONS

Cisco Systems, Inc., Data Sheet, Cisco High Performance Subnet Manager 1.1, Copyright 1992-2006 Cisco Systems, Inc., 3 pp.

* cited by examiner

*Primary Examiner* — Joon H Hwang
*Assistant Examiner* — Suraj Joshi (57) ABSTRACT

Various embodiments of systems and methods for remotely configuring network memory are disclosed. One method embodiment, among others, comprises identifying a first device as having authority to control a memory device from a remote location, and writing start-up or reset parameters to memory of the memory device from the remote location, wherein the start-up or reset parameters are used to enable remote control of the memory device corresponding to remote direct memory access (RDMA) operations.

24 Claims, 8 Drawing Sheets

REMOTE CONFIGURATION OF PERSISTENT MEMORY SYSTEM ATT TABLES

BACKGROUND

Traditionally, computers have stored data in either memory or on other input/output (I/O) storage devices such as magnetic tape or disk. I/O storage devices can be attached to a system through an I/O bus such as a PCI (originally named Peripheral Component Interconnect), or through a network such as Fiber Channel, Infiniband, ServerNet, or Ethernet. I/O storage devices are typically slow, with access times of more than one millisecond. I/O storage devices utilize special I/O protocols such as small computer systems interface (SCSI) protocol or transmission control protocol/internet protocol (TCP/IP), and they typically operate as block exchange devices (e.g., data is read or written in fixed size blocks of data). A feature of these types of storage I/O devices is that they are persistent such that when they lose power or are re-started they retain the information stored on them previously. In addition, networked I/O storage devices can be accessed from multiple processors through shared I/O networks, even after some processors have failed.

System memory is generally connected to a processor through a system bus where such memory is relatively fast with guaranteed access times measured in tens of nanoseconds. Moreover, system memory can be directly accessed with byte-level granularity. System memory, however, is normally volatile such that its contents are lost if power is lost or if a system embodying such memory is restarted. Also, system memory is usually within the same fault domain as a processor such that if a processor fails the attached memory also fails and may no longer be accessed.

Therefore, it is desirable to have an alternative to these technologies which provides the persistence and durability of storage I/O with the speed and byte-grained access of system memory. Further, it is desirable to have a remote direct memory access (RDMA) capable network in order to allow a plurality of client processes operating on multiple processors to safely and rapidly access network memory, and therefore provide the fault-tolerance characteristics of networked RDMA memory.

One type of such a device is a primary network-attached persistent memory unit (nPMU) communicatively coupled to at least one client processor node via a communication system, wherein a primary region in physical memory is assigned to a client process running on the client node and is configured to store information received from the client process. Some nPMU devices also employ mirrored backup nPMUs. An nPMU device combines the durability and recoverability of storage I/O with the speed and fine-grained access of system memory. Like storage, nPMU contents can survive the loss of power or system restart. Like remote memory, an nPMU is accessed using read and write operations across a system area network (SAN). However, unlike system memory, an nPMU can continue to be accessed even after one or more of the processors attached to it have failed. Various nPMU devices are described in related U.S. application entitled "COMMUNICATION-LINK-ATTACHED PERSISTENT MEMORY DEVICE", application Ser. No. 10/351,194, publication 2004/0148360, filed on Jan. 24, 2003, which is incorporated herein by reference.

One unique feature of nPMU devices is the access and translation table (ATT) which supports Remote Direct Memory Access (RDMA) operations initiated by a remote node. For example, once a client processor has communicated with a Persistent Memory Manager (PMM) process to open a memory region inside an nPMU, it can then directly access the memory locations within that region of the nPMU without again going through the PMM.

To perform an RDMA read command, the nPMU requires the client process to provide the starting network virtual memory location of the open region, an offset into the region as well as a context identifier (in the case of multiple memory location spaces).

For proper operation, this memory location range should be within the network virtual memory location range allocated to that region by the PMM. The client process initiating the RDMA read operation also provides a destination pointer containing the address of a local physical memory location to the network interface (NI) at its processor node. The NI in the requesting processor node then transmits the remote read command to a NI of the nPMU device, via the system area network (SAN). The nPMU NI translates the starting network virtual memory location to a physical memory location within nPMU using translation table entries (contained in the ATT) associated with the open nPMU memory region.

By means of the nPMU NI, the nPMU then returns data to the reading processor node starting at the translated physical location of the nPMU memory. The nPMU NI continues translating memory locations even if the read crosses memory page boundaries because the memory location translation logic makes the network virtual memory locations appear contiguous even when they are not. When the read command has completed, the reading processor node's NI marks the read transfer as completed. Moreover, any waiting processes can be notified and, in turn, processed.

During initial start-up of the nPMU, or during a restart, the nPMU must be reconfigured for operation on the RDMA network. Typically, operating personnel are present to effect the start-up process, which, in part, includes initial set-up of the access and translation table (ATT), described in greater detail hereinbelow. However, requiring operating personnel to be present for each start-up process represents a significant operating cost. Also, requiring operating personnel to be present may result in undesirable delays in system operations, particularly when an existing nPMU is recovering from an outage condition.

SUMMARY

A method embodiment comprises, among others, identifying a device as having authority to control a network persistent memory unit (nPMU) from a remote location and populating memory of the nPMU with parameters used to enable remote control by the device corresponding to remote direct memory access (RDMA) operations.

An apparatus embodiment comprises, among others, a remote direct memory access (RDMA) accessible memory and a logic configured to receive initialization instructions that enable remote control from a remote device and store the initialization instructions in the memory.

An apparatus embodiment comprises, among others, logic configured to send a first command to a first device that authorizes control of that device from a remote location, wherein the logic is configured to send a second command that populates memory of the first device from a remote location with start-up or reset parameters used to enable remote control of the first device corresponding to remote direct memory access (RDMA) operations.

A system embodiment comprises, among others, logic configured to identify a first device as having authority to control a memory device from a remote location and populate memory of the memory device with start-up or reset parameters from the remote location, wherein the start-up or reset parameters are used to enable remote control of the memory device corresponding to remote direct memory access (RDMA) operations.

A method embodiment comprises, among others, identifying a first device as having authority to control a memory device from a remote location, and writing start-up or reset parameters to memory of the memory device from the remote location, wherein the start-up or reset parameters are used to enable remote control of the memory device corresponding to remote direct memory access (RDMA) operations.

A system embodiment comprises, among others, means for identifying a first device as having authority to control a memory device from a remote location, and means for writing start-up or reset parameters to memory of the memory device from the remote location, wherein the start-up or reset parameters are used to enable remote control of the memory device corresponding to remote direct memory access (RDMA) operations.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the disclosed embodiments. Moreover, in the drawings, like reference numerals designate corresponding parts throughout the several views.

DETAILED DESCRIPTION

The present disclosure describes systems and methods that remotely configure an access and translation table (ATT) of a network-attached persistent memory unit (nPMU). The configuration is performed by an authorized persistent memory manager (PMM) device that accesses the nPMU through its network interface (NI) that is configured for operation in a remote direct memory access (RDMA) network system.

Although described in the context of remote configuration of persistent memory, one skilled in the art would understand that similar principles apply to remote configuration of other types of memory or storage devices, such as volatile memory.

Figure 1:
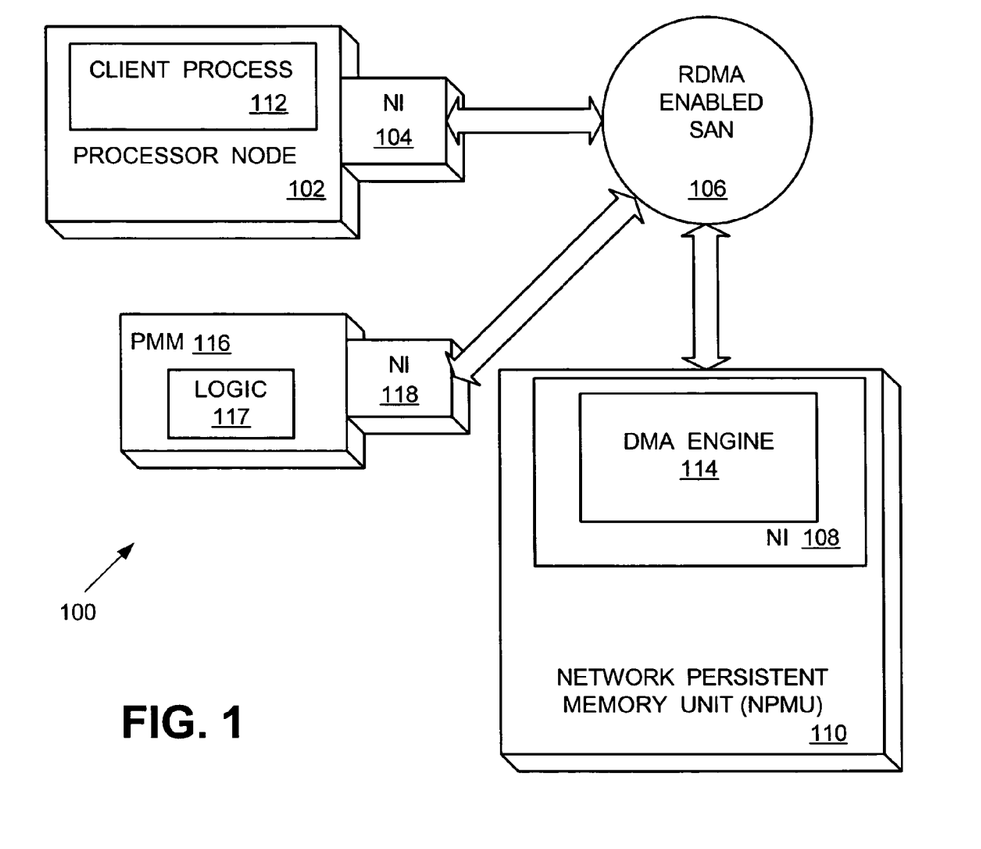
FIG. 1 is a block diagram of an exemplary embodiment of a persistent memory system.

FIG. 1 is a block diagram of an exemplary embodiment of a persistent memory system 100. System 100 consists of a network-attached persistent memory unit (nPMU) 110 that can be accessed by one or more processor nodes 102 through an RDMA-enabled system area network (SAN) 106. In order to access the persistent memory of nPMU 110, a client process 112 (e.g., host) (such as executing software or the like) running on the processor node 102 initiates (targets) remote read or write operations through the processor node's network interface (NI) 104. In this manner, read or write commands are carried on an RDMA-enabled SAN 106 to the nPMU's network interface (NI) 108. Accordingly, after processing, the appropriate data is communicated over the RDMA-enabled SAN 106. In addition to RDMA data movement operations, the nPMU 110 can be configured to respond to various management commands to be described below. In a write operation initiated by processor node 102, for example, once data has been successfully stored in the nPMU 110, such data is durable and will survive a power outage or processor node failure. In particular, memory contents are maintained as long as the nPMU 110 continues to function correctly, even after the power has been disconnected for an extended period of time, or the operating system on the processor node 102 has been rebooted.

In this embodiment, the processor node 102 is a computer system consisting of at least one central processing unit (CPU) and memory wherein the CPU is configured to run an operating system. The processor node 102 is additionally configured to run application software such as databases. The processor node 102 uses the SAN 106 to communicate with other processor nodes 102 as well as with devices such as the nPMU 110 and I/O controllers (not shown).

In one implementation of this embodiment, an RDMA-enabled SAN 106 is a network capable of performing byte-level memory operations such as copy operations between two processor nodes, or between a processor node and a device, without notifying the CPU of processor node 102. In this case, the NI 108, in cooperation with switching functionality of the SAN 106, is configured to perform virtual to physical memory location translation to enable the mapping of contiguous network virtual memory location spaces onto discontiguous physical memory location spaces. This type of memory location translation allows for dynamic management of the nPMU 110. Commercially available SANs 106 with RDMA capability include, but are not limited to, ServerNet, GigaNet, Infiniband, Virtual Interface Architecture compliant SANs, and RDMA over TCP/IP.

Processor nodes 102 are generally attached or coupled to a SAN 106 through the NI 104, although many variations are possible. More generally, however, a processor node need only be connected to an apparatus for communicating read and write operations. For example, in another implementation of this embodiment, processor nodes 102 are various CPUs on a motherboard and, instead of using a SAN, a data bus is used, for example a PCI bus. It is noted that the present teachings can be scaled up or down to accommodate larger or smaller implementations as needed.

The network interface (NI) 108, shown as part of the nPMU 110 though in some embodiments may be separate and communicatively coupled to the nPMU 110, enables access to the persistent memory (or other types of memory) contained within the nPMU 110. Many technologies are available for the various components of FIG. 1, including the type of persistent memory. Accordingly, the embodiment of FIG. 1 is not limited to a specific technology for realizing the persistent memory. Indeed, multiple memory technologies, including magnetic random access memory (MRAM), magneto-resistive random access memory (MRRAM), polymer ferroelectric random access memory (PFRAM), ovonics unified memory (OUM), battery-backed dynamic random access memory (BBDRAM), and FLASH memories of all kinds are appropriate computer-readable storage mediums. Whereas battery-backed solid-state disks (BBSSDs) perform block level transfers, one or more of the disclosed embodiments allow for finer granularity of memory access, including byte-level memory access. Notably, memory access granularity can be made finer or coarser using various embodiments. Where the SAN 106 is used, memory access may be fast enough to support RDMA access. In this way, RDMA read and write operations are made possible over the SAN 106. Where another type of communication apparatus is used, the access speed of the memory used may be fast enough to accommodate the communication apparatus. It should be noted that persistent information is provided to the extent the persistent memory in use may hold data. For example, in one embodiment, persistent memory stores data regardless of the amount of time power is lost; whereas in another embodiment, persistent memory stores data for a few minutes or hours.

In conjunction with the approaches described herein, memory management functionality is provided that creates single or multiple independent, RDMA-accessible network virtual memory locations. Moreover, nPMU meta-data is provided for memory recovery after loss of power or processor failure. Meta-data conveys information that may include, for example, the contents and the layout of the protected memory regions within the nPMU 110. In this way, the nPMU 110 stores the data and the manner of using the data. When the need arises, the nPMU 110 can then allow for recovery from a power or system failure.

As noted above, the NI 108 is configured for operation on the SAN 106, an RDMA network. Accordingly, the NI 108 includes a direct memory access (DMA) engine 114. The DMA engine 114 can be a hardware device that is configured to initially recognize communications arriving from the SAN 106 during a start-up process. The NI 108 may be implemented as a network interface card or the like.

A persistent memory manager (PMM) 116 (e.g., another host) is coupled to the SAN 106. The PMM 116 comprises logic 117 (e.g., state machine) that issues various control commands to the nPMU 110 to enable the remote processor node 102 to perform RDMA functions with the nPMU 110. The PMM 116 interfaces to the SAN 106 via its own NI 118.

Figure 2:
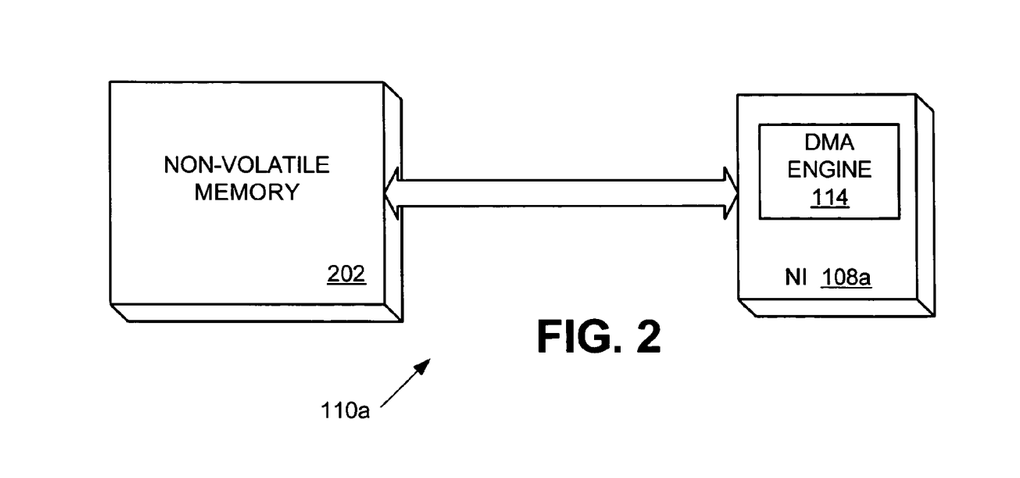
FIG. 2 is a block diagram of an embodiment of a network-attached persistent memory unit (nPMU).

FIG. 2 is a block diagram of an embodiment of the nPMU 110*a*. This simplified nPMU 110*a* uses non-volatile memory 202 communicatively coupled to the NI 108*a* via a communications link such as a bus. Here, non-volatile memory 202 can be, for example, MRAM or Flash memory. The NI 108*a* does not initiate its own RDMA requests, but instead, the NI 108*a* receives commands from the network and carries out the requested operations. Specifically, the NI 108*a* translates the network memory location on incoming requests to physical memory locations in the nPMU 110*a* using mappings provided in an ATT and then carries out the requested operation. Further details on command processing will be discussed below.

Figure 3:
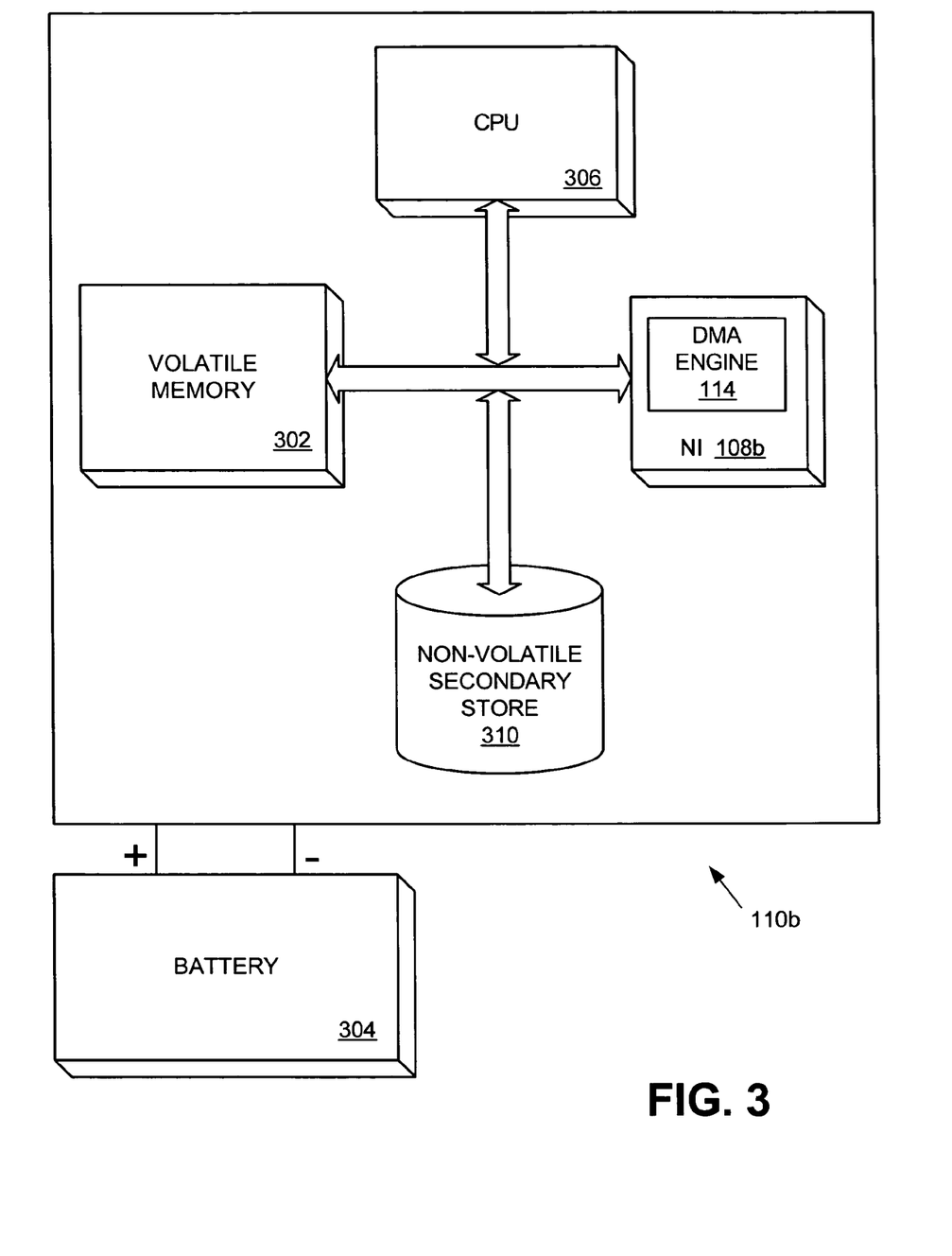
FIG. 3 is a block diagram of an embodiment of an nPMU using battery backup.

FIG. 3 is a block diagram of an embodiment of an nPMU 110*b* using battery backup. Here, a relatively more complex embodiment of nPMU 110*b* using a combination of volatile memory 302 with a battery 304 and a non-volatile secondary store 310 is illustrated. In this embodiment, when power fails, the data within volatile memory 302 is preserved using the power of the battery 304 until such data can be saved to the non-volatile secondary store 310. The non-volatile secondary store 310 can be, for example, a magnetic disk or slow FLASH memory. For the nPMU 110*b* to operate properly, the transfer of data from volatile memory 302 to the non-volatile secondary store 310 occurs without external intervention or any further power other than that supplied from the battery 304. Accordingly, any required tasks can be completed before the battery 304 can discharge. As shown, the nPMU 110*b* includes an optional CPU 306 running an embedded operating system. Accordingly, the backup task (i.e., data transfer from volatile memory 302 to non-volatile secondary store 310) can be performed by software running on the CPU 306. An NI 108*b* is also included to initiate RDMA requests under the control of software running on the CPU 306. Here again, the CPU 306 receives management commands from the network and carries out the requested management operation. Accesses to the nPMU 110*b* continue to be host-initiated RDMA. In this embodiment, data transfer in and out of the nPMU 110*b* is still host-initiated but the command-response protocol between the PMM 116 and its managed nPMU 116*b* may require the NI 108*b* to initiate some non-data-transfer-related operations.

Figure 4:
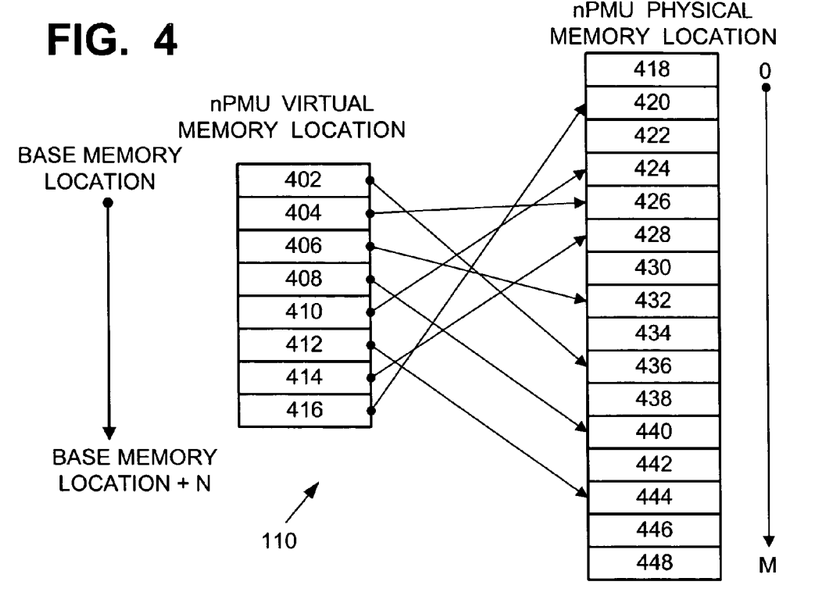
FIG. 4 is a block diagram illustrating mappings from a persistent memory virtual memory location space to a persistent memory physical memory location space.

FIG. 4 is a block diagram illustrating mappings from an RDMA-accessible network virtual memory location space (e.g., including 402-416) to a persistent memory, physical memory location space (e.g., including 418-448). When the client process 112 operating on processor node 102 (FIG. 1) requests the PMM 116 to open a region of persistent memory in an nPMU 110, the nPMU's NI 108 is programmed by the PMM to allow the processor node 102 running the client process 112 to access the appropriate region. This programming allocates a block of network virtual memory locations and maps (i.e., translates) them to a set of physical memory locations. Note that "open," "opening," or the like refers to a process that includes the client process 112 requesting the PMM 116 to open a region, the PMM 116 checking for permission, the PMM 116 programming the PMU's ATT to map the region and make it available to the client process 112, and the client process 112 programming its own NI. The range of nPMU network virtual memory locations can then be contiguous, regardless of where they reside within the physical memory of the persistent memory. Note that some embodiments do not require contiguous nPMU network virtual memory locations. For example, some embodiments may have flexibility to hide discontiguity of network virtual addresses in client-side software.

Upon successful set-up of the translation, the PMM 116 notifies the requesting processor node 102 of the RDMA-accessible network virtual memory location where the contiguous block has been mapped. Once open, the processor node 102 can access nPMU memory locations by issuing RDMA read or write operations to the nPMU 110 at network virtual memory locations within the mapped range. When all of the client processes on a processor node 102 have completed using the open region, the mapping is removed and the RDMA-accessible network virtual memory locations may be re-used for future region mappings. Note that this does not mean that the physical region itself is no longer in use. Instead, it may still be open by one or more processes residing on another processor (or even the same one), but with a different RDMA-accessible network virtual memory location to physical memory location mapping.

Figure 5:
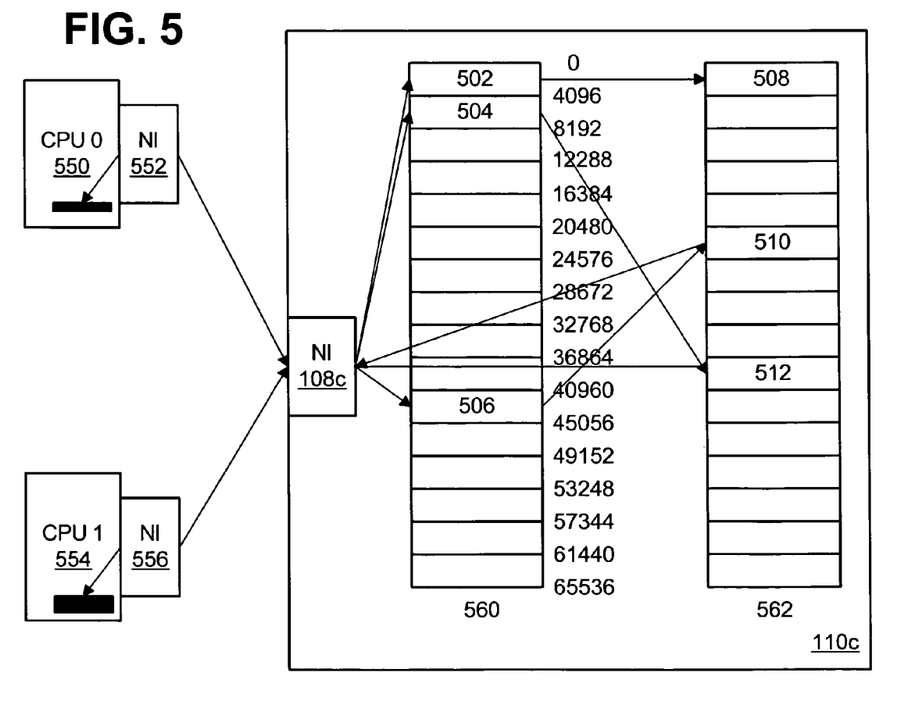
FIG. 5 is a block diagram of an embodiment of an nPMU having at least one persistent memory virtual memory location space.

FIG. 5 is a block diagram of an embodiment of an nPMU 110c having at least one persistent memory virtual memory location space 560. The nPMU 110c operations will be described in the context of a single virtual memory location space. Shown is a single nPMU network virtual memory location space 560 (e.g., including locations 502, 504, 506) that translates to an nPMU physical memory location space 562 (e.g., including locations 508, 510, 512). Once a range of persistent memory is open, the CPU 0 550 can access such range of persistent memory in conjunction with the operation of NI 552 and NI 108c. The PMM 116 opens a range of persistent memory by making available to a CPU a range of virtual memory locations. In requesting access to an open range of nPMU network virtual memory location space, CPU 0 550 passes a command (e.g., read or write) through the NI 552 to the NI 108c. In one embodiment operation, only the CPU 0 550 can access a specified range of RDMA-accessible network virtual memory locations. In some embodiments, a range of RDMA-accessible network virtual memory locations may be shared by two or more CPUs, or they may be restricted to only a subset of the processes on one or more CPUs. Accordingly, as part of its PMM-configured functionality, the NI 108c validates the ability of CPU 0 550 to target the requested RDMA-accessible network virtual memory location 560 by referring to the network virtual memory location's entry in the ATT. If within the allowed range of the CPU 0 550, the NI 108c performs the requisite memory location translation, and finally performs the requested operation (e.g., read or write) against the nPMU physical memory location 562.

Figure 6:
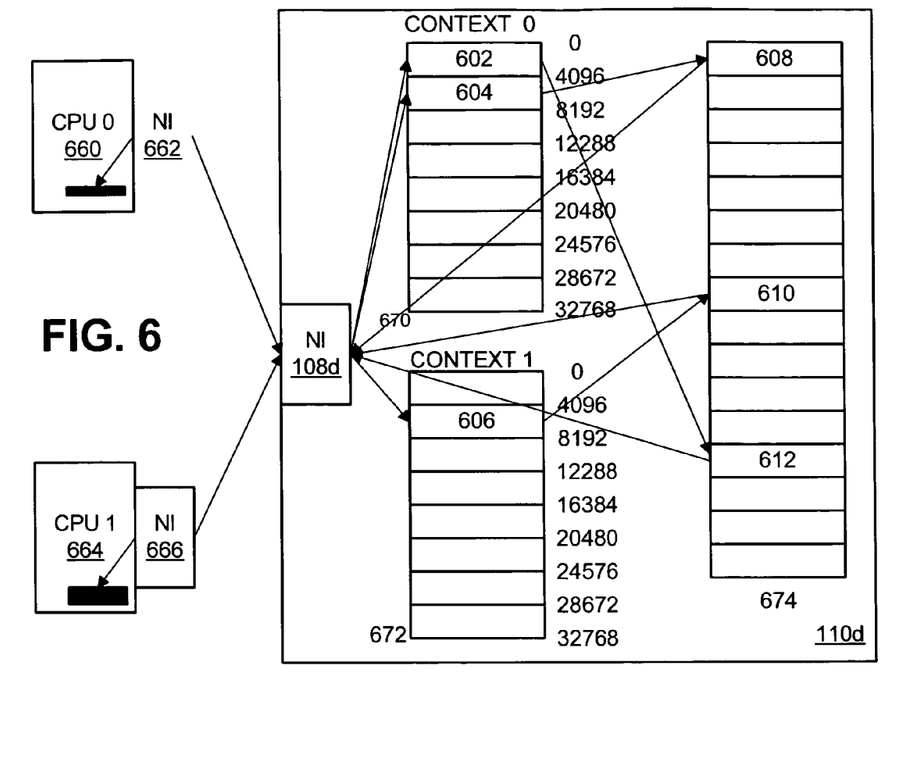
FIG. 6 is a block diagram of an embodiment of an nPMU having multiple persistent memory virtual memory location spaces.

FIG. 6 is a block diagram of an embodiment of an nPMU 110d having multiple RDMA-accessible network virtual memory location spaces. Here, the nPMU 110d can also accommodate multiple network virtual memory location contexts (spaces) 670 (e.g., including locations 602, 604) and 672 (e.g., including location(s) 606) with their respective RDMA-accessible network virtual memory location spaces and translates each space independently into the nPMU physical memory location space 674 (e.g., including 608, 601, 612). SANs that implement multiple memory location spaces include VI Architecture (VIA) SANs, which in turn include GigaNet and ServerNet II (in VIA mode), as well as Infiniband. There are similarities between the nPMU 110d of FIG. 6 and the nPMU 110c of FIG. 5. In the nPMU 110d, however, the nPMU 110d or more specifically the nPMU's NI 108c needs to discern first among the multiple virtual memory location contexts 670 and 672 and then translate the virtual memory location contexts 670 and 672 to the appropriate nPMU physical memory location 674.

The NI 108d in this embodiment provides the process-equivalent network virtual memory locations. Accordingly, the NI 108d is designed for user-mode as well as kernel-mode access to RDMA-accessible network virtual memory and, in turn, nPMU physical memory. Many independent network virtual memory location spaces can be made available using different network memory location contexts. Although only two network memory location contexts are shown, many more are possible. In fact, to the extent that the present embodiments are applicable in internet applications, many thousands of network memory location contexts are possible. To specify a particular network memory location space, an RDMA command (e.g., read or write) specifies a context identifier along with the desired network virtual memory location. The NI 108d can therefore accommodate various processor nodes (e.g., CPU 0 660 and CPU 1 664) to share the same context identifier. Moreover, separate network virtual memory locations from different contexts can translate to the same physical memory location.

As before, when a client process 112 in cooperation with the PMM 116 (FIG. 1) opens a region of persistent memory for access, the NI 108d is programmed by its PMM 116 after the PMM 116 verifies that the requesting processor node is authorized to access to the region. Then, as before, the PMM 116 programs the NI 108d. However, in the case of multiple contexts, the programming now creates a context in the NI 108d. The context includes a block of network virtual memory locations that are translated to a set of physical memory locations in the nPMU. However, unlike the case outlined in FIG. 5, these virtual memory locations are only valid within the new context, which must be identified as part of any network operation. For example, RDMA-accessible network virtual memory location 602 of context 0 670 translates to nPMU physical memory location 612; and RDMA-accessible network virtual memory location 606 of context 1 672 translates to nPMU physical memory location 610. As before, the RDMA-accessible network virtual memory locations are contiguous regardless of the number of nPMU physical memory locations allocated. The physical memory locations, however, can be located anywhere within the nPMU physical memory 674.

Figure 7:
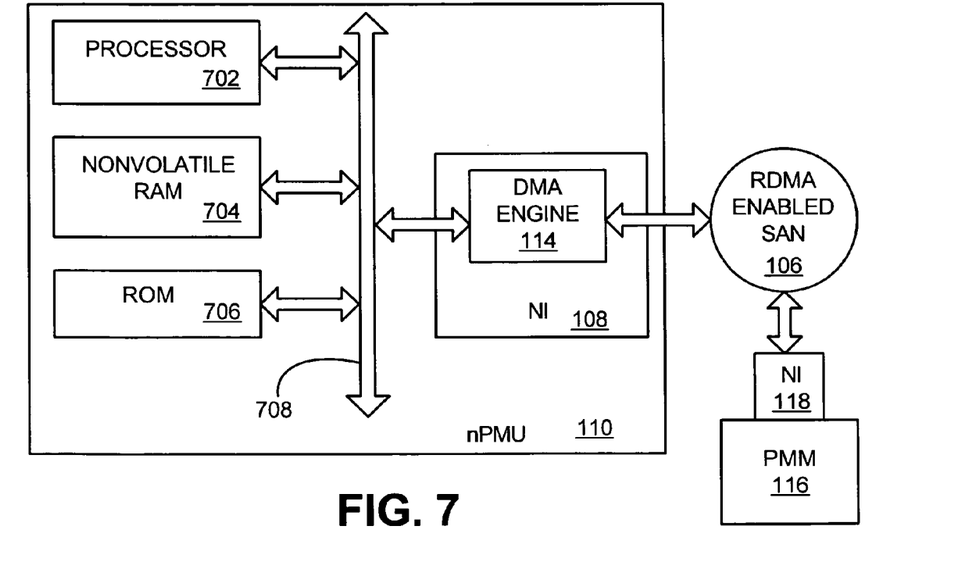
FIG. 7 is a block diagram showing selected components of an embodiment of an nPMU.

FIG. 7 is a block diagram showing selected components of an embodiment of an nPMU. Included are a NI 108, a device-embedded processor 702, a nonvolatile random access memory (RAM) 704 and an optional read-only memory (ROM) 706. These devices are communicatively coupled together via an internal bus 708 in this simplified illustrative embodiment. Various embodiments may use other types of connections to communicatively couple the above-described devices, and/or to communicatively couple the above-described devices with other components (not shown).

Processor 702 may be any suitable device, such as an nPMU-embedded central processing unit (CPU), that controls the nPMU 110. As noted above, the processor 702 of the nPMU 110 does not actively perform (e.g., it does not actively initiate any management commands) operations unless directed to by the controlling PMM 116 (FIG. 1) or by another remote processor node 102 performing RDMA operations. Accordingly, processor 702 may be limited in its functionality when the nPMU 110 is operating.

While all passive nPMUs 110 are managed externally by a PMM 116, there are differences between individual NIs 108 that may be used to interface to the SAN 106. Below are described two general exemplary types of NIs 108 that may be configured remotely by a PMM 116.

Figure 8:
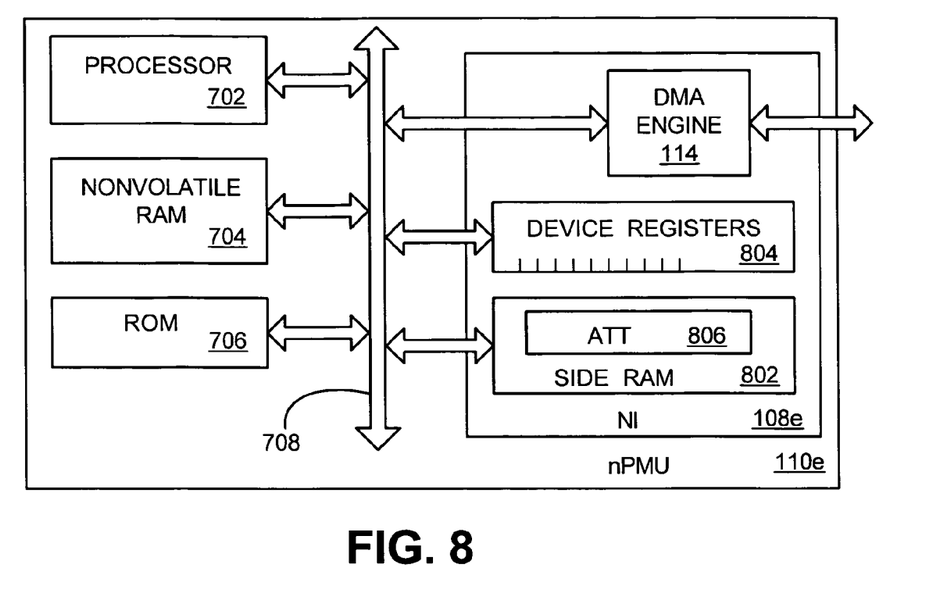
FIG. 8 is a block diagram showing selected components of an embodiment of a network interface (NI).

FIG. 8 is a block diagram showing selected components of an embodiment of a NI 108e for an embodiment of an nPMU 110e. The NI 108e includes the DMA engine 114, a side random access memory (RAM) 802, device registers 804 and other components (not shown). In this type of NI 108e, the side RAM 802 is relatively large. The side RAM 802 can contain the configuration state for the NI as well as the NI's ATT 806.

Using "ServerNet" or similar networks, the side RAM 802 and device registers 804 may be accessed remotely by the PMM 116 through SAN 106 because the side RAM 802 and device registers 804 are simply mapped into physical memory locations on the nPMU's system bus 708. Therefore, incoming RDMA-accessible network virtual memory locations are translated into physical memory locations on the bus 708, and therefore the accesses can be targeted at any memory location in the side RAM 802 or device registers 804. Thus, the PMM 116 can directly manipulate entries in the ATT 806 and can even reconfigure the NI 108e by accessing its side RAM 802 and/or device registers 804, all without the help of the local processor 702.

As part of the initialization process, processor 702 may be booted. Thus, one of the first series of configuration commands may cause the processor 702 to retrieve a boot program residing in a predefined portion of memory of the nPMU 110. Also, the NI 108e is partially configured such that the NI 108e recognizes incoming messages from SAN 106.

During start up, or after receipt of a reset command, the PMM 116 directly configures the NI 108e. Configuration commands are received from the PMM 116 by the DMA engine 114. Since the DMA engine 114 is configured (e.g., at the factory) to recognize such commands, they are passed directly onto the system bus 708, and communicated into the side RAM 802, the ATT 806, or the device registers 804. The configuration commands permit the PMM 116 to begin managing the nPMU 110.

Initially, a first series of configuration commands are sent from the PMM 116 to the NI 108e that initialize the NI 108e. For example, one of these initial configuration commands identifies the PMM 116 to the NI 108e such that the PMM 116 is authorized to take control (take ownership) of the nPMU 110e. Only the "owner" PMM is allowed to modify the ATT 806 or device registers 804. The nPMU 110e will reject all commands from other devices.

Thus, one of the initial configuration commands includes at least one network address identifying the PMM 116 as the owner. In one embodiment, the network address identifying the PMM 116 is communicated directly into the device register 804. After receiving the first series of configuration commands, the NI 108e is configured so that commands sent to the nPMU 110 are recognized such that the nPMU 110 can be directly controlled by the PMM 116. That is, after receiving this first series of commands, software running on processor 702 configures the ATT 806 so that PMM 116 may thereafter directly populate the ATT using RDMA operations without involving processor 702.

Then, a second series of configuration commands are sent from the PMM 116 to the NI 108e. These configuration commands populate the ATT 806 with information necessary for operating the nPMU 110. For example, processor node 102 (FIG. 1) may be identified as a device that is authorized to perform RDMA operations with the nPMU 110. In some embodiments, the client process (e.g., client process 112, a software module, etc.) is the entity that is authorized (and thus identified as authorized) to perform RDMA operations. As part of the second series of configuration commands, a network address (e.g., identity) identifying processor node 102 is communicated into the ATT 806 by the PMM 116. In some embodiments, the identity may be associated with a client process, as described above. Further, the identity may includes an authenticated identity and an encryption key, an authenticated steering tag to be included by the client device in subsequent remote direct memory access requests, among other variations. Also, memory location translation information for mapping network virtual memory locations associated with the above-described network virtual memory location space 560 (FIG. 5) to the above-described physical memory locations associated with the physical memory location space 562 (FIG. 5) may be communicated into the ATT 806 by the PMM 116.

Figure 9:
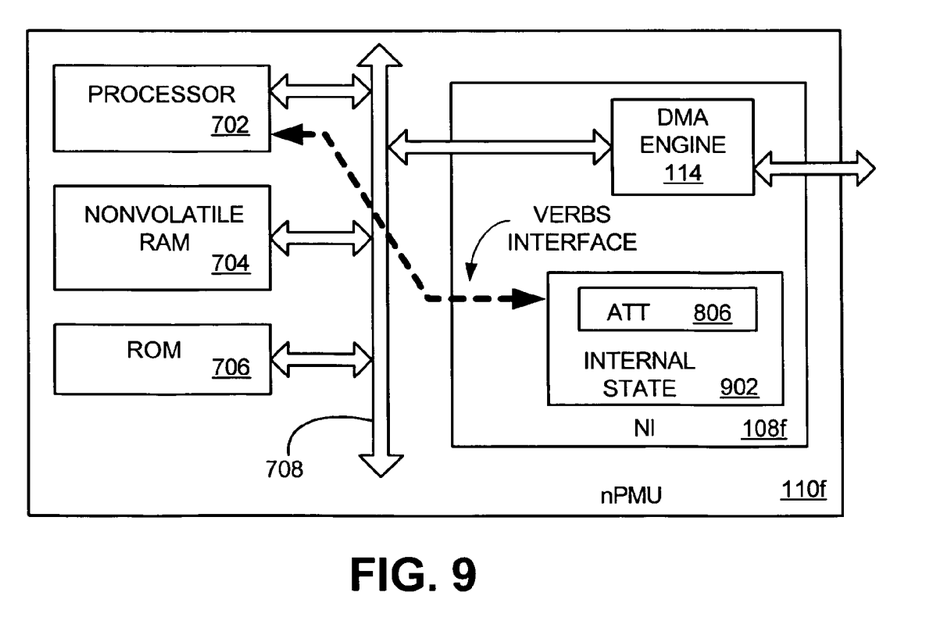
FIG. 9 is a block diagram showing selected components of another embodiment of a NI.

With NIs that have a side RAM 802 and/or device registers 804 that can not be directly accessed by the PMM 116, the local processor 702 must be accessed to initiate changes in the NI 108. FIG. 9 is a block diagram showing selected components of another embodiment of a NI 108f for another nPMU embodiment 110f. Here, the NI 108f utilizes a "verbs interface" (e.g., a well-known, implementation-specific mechanism to define the characteristics of an applications programming interface (API)) to manipulate the ATT 806 or other device registers 804. A verbs interface program may reside in a side RAM or the like if the NI 108f prohibits internal data manipulation directly by a remote device, such as the PMM 116.

With this embodiment of a NI 108f, the PMM 116 remotely initializes the ATT 806 by communicating the configuration commands to processor 702. Processor 702 then communicates information corresponding to the received configuration commands, using the verbs interface, to the NI 108f. The NI 108f then populates the ATT 806 with the information corresponding to the received configuration commands. Thus, responsibility for populating the ATT 866 is implemented below the verbs interface. FIG. 9 also shows internal state module 902, which provides state about network data transfers or active connections.

In some situations, it may be desirable to have another PMM become the managing device. A reset command is communicated from the new PMM to the NI 108 which clears the identification of the current controlling PMM to the NI 108. Immediately after reset, the processor 702 re-creates any volatile data structures such as those needed for device management. For example, the fields in a boot information area may be initialized to appropriate values. The identifier which identifies a PMM as the owner is initialized to a null value indicating that initially no PMM is managing the nPMU 110. Also, various command reception and response areas are initialized so that the NI 108 recognizes commands from a transmitting PMM. The ATT 806 is also initialized to a default state. For example, entries are added to the ATT 806 so that any PMM 102 can read from the boot information area in order to establish ownership of the nPMU 110. Accordingly, when the next initial configuration command is received, the other PMM my then be authorized to take control of the nPMU 110.

Figure 10:
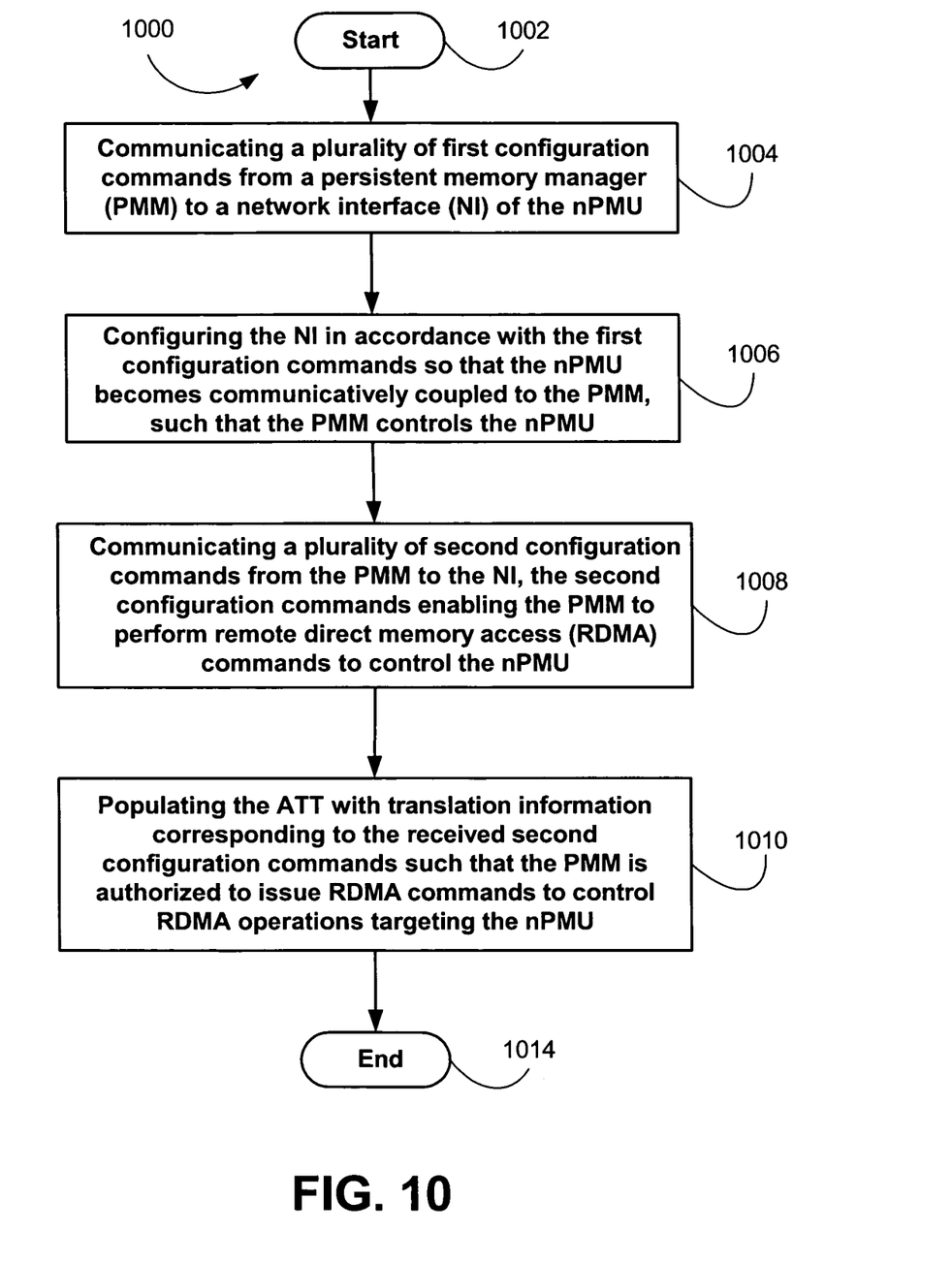
FIG. 10 illustrates an embodiment of a process for remotely configuring an access and translation table (ATT) of an nPMU.

FIG. 10 is a flowchart 1000 illustrating a process used by an embodiment of the persistent memory system 100 to remotely configure an ATT 806. The flow chart 1000 shows the architecture, functionality, and operation of an embodiment for remotely configuring an ATT 806 of a nPMU 110. An alternative embodiment implements the logic of flow chart 1300 with hardware configured as a state machine. In this regard, each block in FIGS. 10-12 may represent a module, segment or portion of code, which comprises one or more executable instructions for implementing the specified logical function(s). It should also be noted that in some alternative implementations, the functions noted in the blocks may occur out of the order noted in FIGS. 10-12, or may include additional functions, without departing from the functionality of the persistent memory system 100. For example, two blocks shown in succession in FIGS. 10-12 may in fact be substantially executed concurrently, the blocks may sometimes be executed in the reverse order, or some of the blocks may not be executed in all instances, depending upon the functionality involved, as will be further clarified hereinbelow.

An exemplary process to remotely configure an ATT 806 of a nPMU 110 is illustrated in FIG. 10 starts at block 1002. At block 1004, a plurality of first configuration commands are communicated from a persistent memory manager (PMM) to a network interface (NI) of the nPMU. At block 106, the NI is configured in accordance with the first configuration commands so that the nPMU becomes communicatively coupled to the PMM, such that the PMM controls the nPMU At block 1008, a plurality of configuration commands are communicated from the PMM 116 to the NI 108, the second configuration commands enabling the PMM 116 to perform remote direct memory access (RDMA) commands to control the nPMU 110. At block 1010, the ATT 806 is populated with translation information corresponding to the received second configuration commands such that the PMM is authorized to issue RDMA commands to control RDMA operations targeting the nPMU. The process ends at block 1012.

Figure 11:
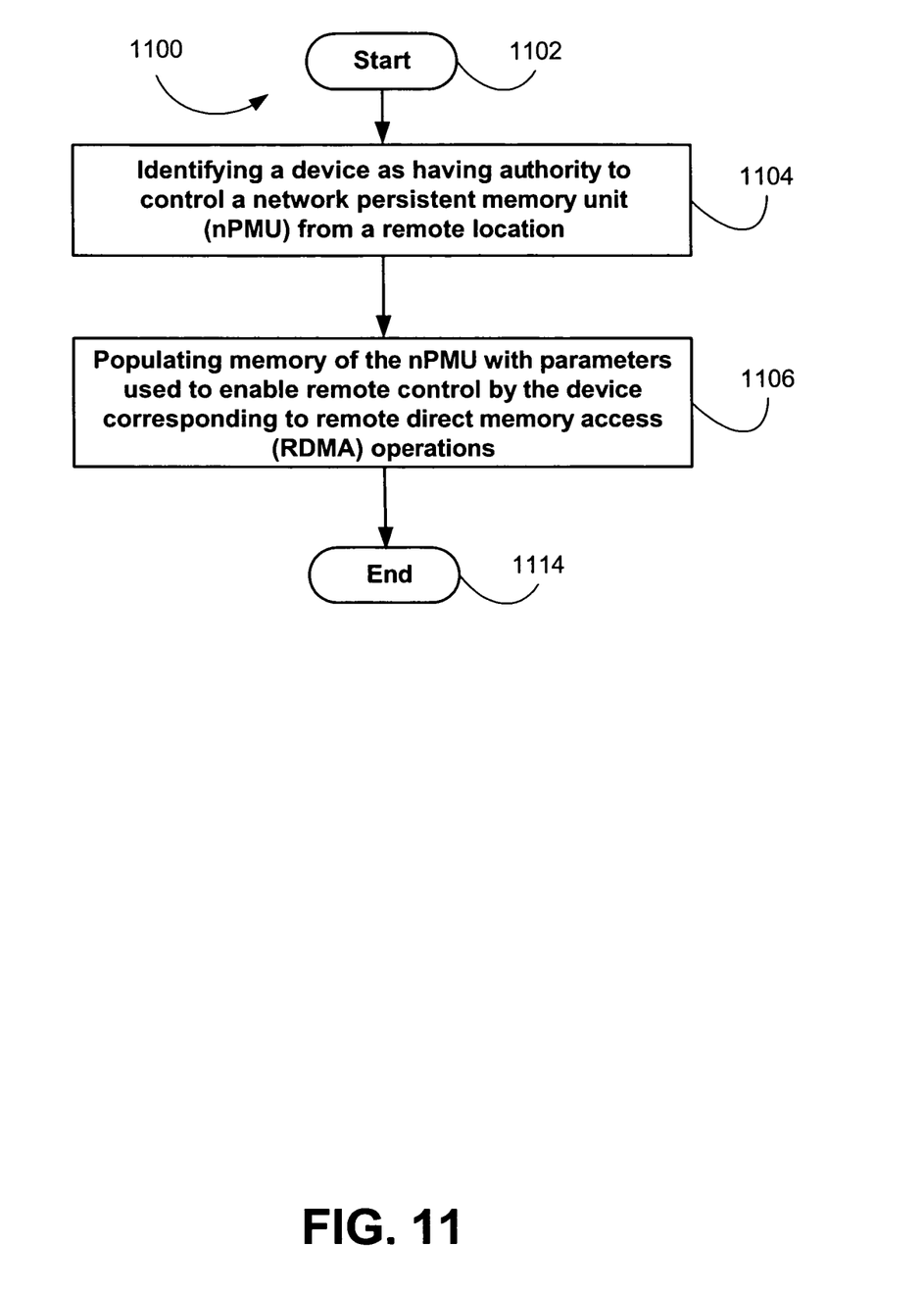
FIG. 11 illustrates an embodiment of a process for remotely configuring an access and translation table (ATT) of an nPMU.

As would be appreciated from the above description, another process embodiment 1100, shown in FIG. 11, starts at block 1102, and comprises identifying a device as having authority to control a network persistent memory unit (nPMU) from a remote location (block 1104), and populating memory of the nPMU with parameters used to enable remote control by the device corresponding to remote direct memory access (RDMA) operations (block 1106). The process ends at block 1108.

Figure 12:
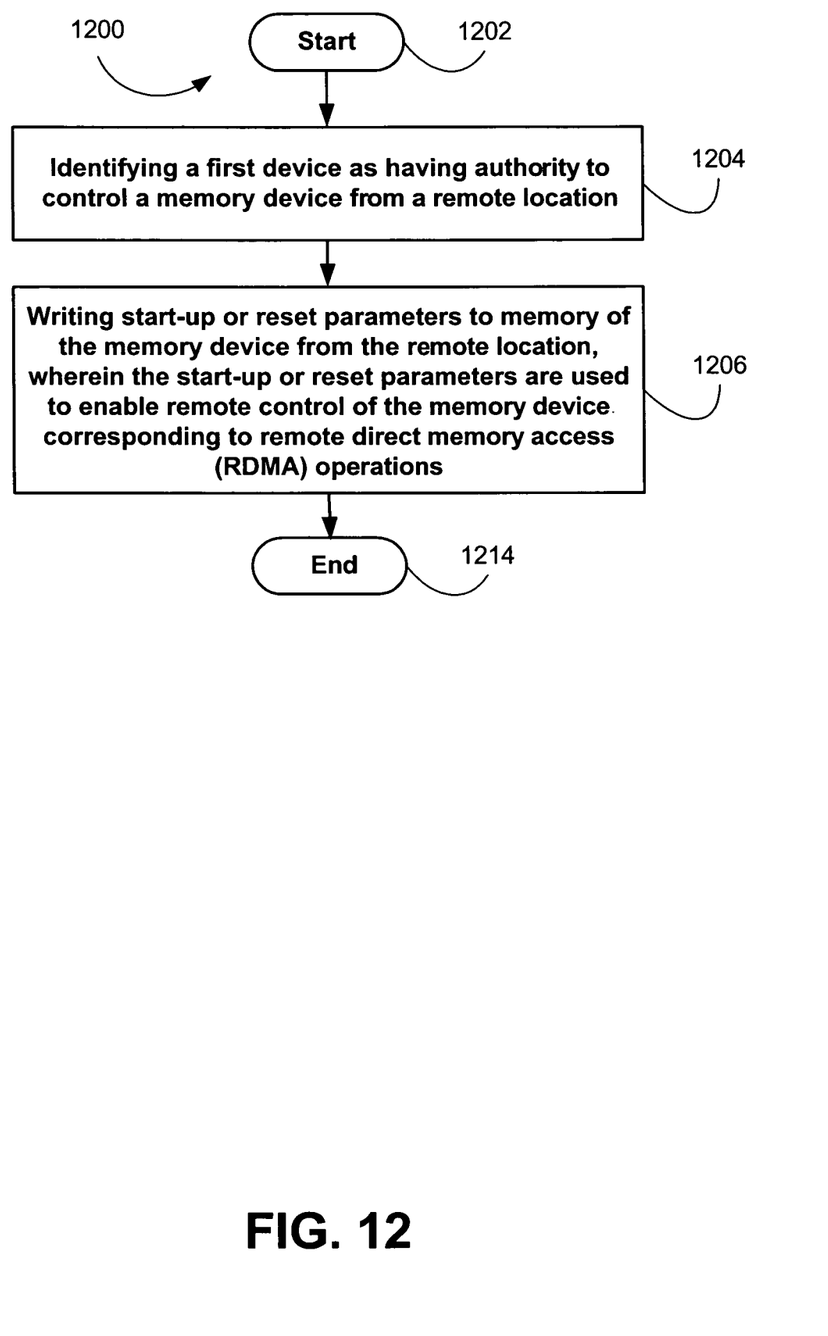
FIG. 12 illustrates an embodiment of a process of remotely configuring network memory.

Another embodiment 1200, shown in FIG. 12, starts at block 1202, and comprises identifying a first device as having authority to control a memory device from a remote location (block 1204), and writing start-up or reset parameters to memory of the memory device from the remote location, wherein the start-up or reset parameters are used to enable remote control of the memory device corresponding to remote direct memory access (RDMA) operations (block 1206). The process ends at block 1208.

While various embodiments and advantages have been described, it will be recognized that a number of variations will be readily apparent. For example, in implementing persistent memory, many technologies are available. As another example, the PMM, nPMU, and processor nodes (clients) are all described using separate blocks. However, one skilled in the art would understand that various bundling configurations may be implemented, such as the PMM could be bundled either with the client or an nPMU. As another example, a PMM may be co-located in one of many nPMUs (or in a separate box) and the PMM remotely controls all of the other nPMUs. Thus, the present approach may be widely applied consistent with the disclosure herein and the claims which follow.

What is claimed is:

1. A method for remotely configuring a network persistent memory unit (nPMU), comprising:
issuing a first command to the nPMU from a persistent memory manager (PMM) device, the PMM remotely located from the nPMU, and the first command indicating the PMM has authority to control the nPMU; and
enabling remote direct memory access (RDMA) of a processor node to the nPMU, the processor node remotely located from the nPMU, the enabling by:
populating memory of the nPMU by the PMM, the populating without involvement from an nPMU processor.

2. The method of claim 1, wherein issuing the first command further comprises communicating, by the PMM, a network address of the PMM device.

3. The method of claim 1, wherein populating further comprises writing, by the PMM, an identity of a client device authorized to perform RDMA with the nPMU.

4. The method of claim 3, wherein writing said identity comprises writing a network address of the client device.

5. The method of claim 1, wherein populating comprises writing to an access and translation table (ATT).

6. The method of claim 1, wherein populating comprises writing to a side RAM.

7. The method of claim 1, wherein populating comprises writing to a device register.

8. The method of claim 1, wherein populating comprises writing memory location translation information for mapping network virtual memory locations to physical locations in the memory.

9. The method of claim 1 wherein the PMM device and the processor node operate on the same physical hardware.

10. The method of claim 1 wherein the PMM device and the processor node have separate physical hardware.

11. The method of claim 1 wherein enabling further comprises enabling RDMA of a particular client process executing on the processor node.

12. An apparatus, comprising:
a first memory;
a processor;
a bus coupled the first memory and the processor;
a network interface coupled to the bus, the network interface comprises a second memory configured to store memory location translation information, and the network interface configured to couple the first memory and processor to a network supporting remote direct memory access (RDMA) operations;
the network interface is configured to receive information over the network from a persistent memory manager (PMM) device, and to populate the memory location translation information based on the information received, the receipt from the PMM and population of the memory location translation information without involvement of the processor.

13. The apparatus of claim 12, wherein the memory location translation information further comprises information mapping network virtual memory locations to physical locations in the first memory in RDMA operations to the first memory.

14. The apparatus of claim 12, wherein the network interface is further configured to:
receive information comprising an identity of a client device authorized to perform RDMA to the first memory, the client device remotely located from the apparatus, and the receipt without involvement of the processor; and
provide RDMA access to the first memory for the client device without involvement of the processor.

15. The apparatus of claim 14, wherein the identity of the client device is a network address of the client device.

16. The apparatus of claim 14, wherein the identity of the client device is associated with a client process.

17. The apparatus of claim 14, wherein the identity of the client device includes an authenticated identity and an encryption key.

18. The apparatus of claim 14, wherein the identity of the client device includes an authenticated steering tag to be included by the client device in subsequent remote direct memory access requests.

19. The apparatus of claim 12, wherein the network interface comprises a DMA engine.

20. The apparatus of claim 12, wherein the second memory further comprises a side RAM comprising at least one selected from the group consisting of: a device register; and access and translation table.

21. The apparatus of claim 12, wherein the first memory comprises volatile memory.

22. The apparatus of claim 12, wherein the first memory comprises persistent memory.

23. The apparatus of claim 12, wherein the network interface is configured to create an initial entry in the memory location translation information mapping memory locations from the apparatus's second memory into network-accessible virtual memory locations.

24. A non-transitory computer-readable storage medium storing instructions, when executed by a processor, cause the processor to:
   send instructions to a network persistent memory (nPMU) device, the instructions identifying a first device as having authority to control the nPMU device from a remote location; and then
   populate a first memory of the nPMU device with parameters, the population by remote direct memory access (RDMA) to the first memory, and the parameters enable RDMA operations to a second memory of the nPMU, and the parameters enable translation of network address to physical addresses of within the first memory.

* * * * *